United States Patent
Armanto et al.

[11] Patent Number: 6,094,587
[45] Date of Patent: Jul. 25, 2000

[54] PROGRAMMING OF A TELEPHONE'S RINGING TONE

[75] Inventors: Taneli Armanto, Paimio; Vesa Ylitolva, Salo; Jani Leppalammi, Pirkkala, all of Finland

[73] Assignee: Nokia Mobile Phones Ltd., Espoo, Finland

[21] Appl. No.: 08/995,795

[22] Filed: Dec. 22, 1997

[30] Foreign Application Priority Data

Dec. 30, 1996 [FI] Finland .................................. 965265

[51] Int. Cl.$^7$ ....................................... H04B 1/38
[52] U.S. Cl. ................................. 455/567; 379/374
[58] Field of Search ..................... 455/550, 567; 379/372, 373, 374

[56] References Cited

U.S. PATENT DOCUMENTS

| | | | |
|---|---|---|---|
| 4,866,766 | 9/1989 | Mitzlaff | 379/374 |
| 4,868,561 | 9/1989 | Davis | 340/825.44 |
| 5,153,829 | 10/1992 | Furuya et al. | 364/419 |
| 5,404,580 | 4/1995 | Simpson et al. | 455/89 |
| 5,452,354 | 9/1995 | Kyronlahti et al. | 379/375 |
| 5,930,352 | 7/1999 | Hiraiwa | 379/387 |
| 5,940,767 | 8/1999 | Bourgeois et al. | 455/466 |
| 5,943,399 | 8/1999 | Bannister et al. | 379/88.17 |

FOREIGN PATENT DOCUMENTS

| | | |
|---|---|---|
| 0684591 A1 | 11/1995 | European Pat. Off. . |
| 2301261 | 11/1996 | United Kingdom . |
| WO 92/03891 | 3/1992 | WIPO . |
| WO 96/06417 | 2/1996 | WIPO . |

OTHER PUBLICATIONS

European Telecommunication Standard, ETS 300 511 "European Digital Cellular Telecommunications System-(Phase 2); Man–Machine Interface (MMI) Of The Mobile Station (MS) (GSM 02.30)", Jul. 1995.
TS GSM 02.04.
TS GSM 02.90.
TS GSM 03.38.
TS GSM 03.40.

*Primary Examiner*—Reinhard J. Eisenzopf
*Assistant Examiner*—N Mehrpour
*Attorney, Agent, or Firm*—Perman & Green, LLP

[57] ABSTRACT

The present invention relates to a method for programming a ringing tone of a telephone, wherein, in the telephone, the ringing tone is stored in a ringing tone memory and reproduced by means of sound reproduction devices as a response to an incoming call. In the method, the ringing tone is transformed into characters containing specifications of notes and the characters are sent to the telephone, e.g., in a short message. In the telephone, the received characters are modified into such a form that they can be stored in a memory.

10 Claims, 5 Drawing Sheets

PROGRAMMING OF A TELEPHONE'S RINGING TONE

FIELD OF THE INVENTION

The present invention relates to a method for programming a telephone's ringing tone, wherein, in the telephone, the ringing tone is stored in a ringing tone memory and reproduced by means of sound reproduction means as a response to an incoming call. The invention also relates to a mobile station and a mobile communications system, which comprises a mobile communications network and at least one mobile station for wireless communication and the system having means for transmitting and receiving speech, a memory for storing a ringing tone and means for reproducing the ringing tone as a signal of an incoming call.

BACKGROUND OF THE INVENTION

Mobile phones have originally had ringing tones similar to ordinary telephones, which have mainly resembled the ringing of a clock. When a mobile phone of a specific make and model had one fixed ringing tone problematic situations occurred, when two users in the same space had the same type of mobile phone and, thus, the same kind of ringing tone, in which case it was confusing as to whose phone was actually ringing. This problem has been solved by making the ringing tone dependent on either the user's own telephone number or the telephone number of a caller. However, the ringing tones produced on the basis of two almost identical telephone numbers may sound so much alike, that it is difficult to distinguish one ringing tone from the other. In addition, by producing a ringing tone on the basis of a telephone number, ringing sound effects with different tones are mainly achieved, which may even annoy the user, i.e., the user is not allowed to select a ringing tone to his/her liking.

This problem has been solved further as mobile phones have become more advanced. Currently, mobile phones normally have several pre-stored ringing tones from amongst which the user may select the preferred ringing tone. In addition to ordinary ringing tones, melodies from familiar pieces of music have been implemented as ringing tones by means of modern technology, and they are also amongst the ringing tones to choose from. With the enormous increase in the use of mobile phones, it has turned out that even as many as ten different ringing tones in a mobile phone are not enough to solve the problem of several mobile phone users thinking that it is their phone ringing, when someone else's phone is ringing. In addition, it may be that the user does not like any of the pre-stored ringing tones. Ordinary telephones, which have a limited number of different types of ringing tones, often present a similar problem.

This situation has been improved by enabling ringing tones to be programmed by means of a user interface of a telephone or other communication device. One solution has been presented in U.S. Pat. No. 4,866,766, wherein a user can input in a telephone different kinds of parameters, which define a ringing tone sequence, in the form of a pulse, such as frequency, pulse length, the number of pulses in a group, period between pulses, the number of pulse groups etc. These parameters are input as different numbers. Another kind of solution has been presented in Publication WO 92/03891, wherein a ringing tone of a paging device can be programmed by switching on or illuminating specific pixels on a matrix display. The position of the pixels in the vertical direction corresponds to a specific pitch of a note (E, F, G, A, H, C, D) and the duration of a note is determined according to the successive pixels. Another corresponding solution has been presented in Publication EP 684 591 A1, wherein it is possible to program, on a display of a paging device, a ringing tone so that the pitch of a note is displayed on the display as a letter symbol (DO, RE, MI, FA, SO, LA, TI) and the duration of a note can be modified as a sequence of a number of the same letter symbols. Due to the defects of the solutions presented above, regarding the programming of a ringing tone, a solution has been presented in Finnish Patent Application 960858, submitted on Feb. 23, 1996, wherein it is possible, e.g., to program a ringing tone as notes by inputting the notes graphically on a stave, displayed on a display, directly in the form of graphic notes.

However, the programming of ringing tones through a user interface has its disadvantages. A user has to take the trouble to input different kinds of parameters, characters or notes in different ways. In addition, in many of the examples presented above, the user is supposed to have a knowledge of music theory in order to produce a specific melody in his/her telephone.

SUMMARY OF THE INVENTION

To facilitate the programming of a ringing tone, a solution has been presented in U.S. Pat. No. 4,868,561, wherein an owner of a paging device can obtain a new ringing tone for the paging device by air. This is accomplished so that the owner of the paging device phones a paging system operator, informs the identifier of the paging device (telephone number) and selects a desired ringing tone from a catalogue he/she already has and informs the paging system operator the identifier of the ringing tone in question. In this case, a paging transmitter first prepares the paging device for the changing of the ringing tone by sending the paging device a message of the changing of the ringing tone and, after that, the paging transmitter sends a ringing tone sequence, whereupon the paging device replaces the ringing tone sequence stored in the memory with the new ringing tone sequence received by air.

A disadvantage of the solution for programming a ringing tone, as presented above, is that a user must separately contact a paging transmitter that operates different ringing tones, and the user can only obtain those ringing tones found at the paging transmitter and in the user's catalogue, and the identifier of which is thus known to him/her. In addition, the paging device cannot simultaneously receive a paging message, because the transmission of a ringing tone sequence keeps the channel engaged at that moment. Correspondingly, a disadvantage is that only the paging system operator is capable of implementing the programming, i.e., transmitting the ringing tone sequence by air. In addition, the paging device (its ringing tone memory) must first be prepared for the changing of the ringing tone, which requires an additional transmission.

Another solution concerning sending audio over the air has been disclosed in publication WO 96/06417, which discloses a paging system in which the transmitter may include an audio composition in a paging message sent to a pager. Upon receipt of the message at the pager, the pager provides a normal audio alert and when the user reads the message, the message data is shown on the display and the audio composition that was included in the message is reproduced by an audio transducer for enhancing the presentation of information by blending audio and visual information. The publication does, however, not suggest programming of the audio alert, i.e. the ringing tone of the pager.

The present invention comprises a device and a method therefor, for programming a ringing tone, which increases the possibility of programming a ringing tone. In the method, the ringing tone is sent to a mobile station in the form of a ringing tone message including an identifier identifying the message as a ring tone and, in reception, the ringing tone message is identified on basis of the ring tone identifier, whereafter it is modified into a suitable form for a ringing tone generator and memory. The ringing tone is preferably transmitted by means of wireless communication. In this case, the ringing tone can be sent directly to the receiving device without any pre-warning and without first preparing the ringing tone memory for the incoming ringing tone. The ringing tone can be sent as a mobile data call through a voice channel or apart from the voice channel. Apart from the voice channel, the ringing tone can be sent as characters in a short message, in USSD (Unstructured Supplementary Service Data) or by means of an off-line infrared link, e.g., of IrDa type. The USSD has been specified in more detail in GSM specifications, e.g., in the following documents: TS GSM 02.04, TS GSM 02.30, TS GSM 02.90, TS GSM 03.38, TS GSM 03.40. A mobile station according to the present invention has means for detecting a ring tone identifier in the message and for modifying a received ringing tone message for a ringing tone generator and a ringing tone memory. Correspondingly, the mobile station according to the present invention may have means for modifying a ringing tone, stored in a ringing tone memory, so that it can be sent to a second mobile station. For transmission the mobile station has means for adding a ring tone identifier in the message. The ringing tone is preferably sent as note data, in which case, in reception, the note data are modified into notes that specify the ringing tone.

The present invention concerns a mobile communications systems with mobile stations and a mobile station for wireless communication, which have means for transmitting and receiving speech, a memory for storing a ringing tone, and means for reproducing the ringing tone as a signal of an incoming call, and being wherein they comprise means for modifying the ringing tone, stored in the memory, into characters and for sending said characters, and means for sending said characters with a ringing tone identifier identifying the transmission as a ringing tone transmission.

Also the present invention concerns a mobile communications system with mobile stations and a mobile station for wireless communication, which have means for transmitting and receiving speech, a ringing tone memory for storing a ringing tone, and means for reproducing the ringing tone as a signal of an incoming call, being wherein they comprise means for receiving messages with characters, means for detecting a ringing tone identifier in a received message informing the message is a ringing tone, means for receiving a ringing tone as characters, and means for modifying said characters into a form for being stored in the ringing tone memory.

Further the present invention concerns a method for programming a ringing tone of a telephone, wherein a ringing tone is stored in a memory and reproduced by means of sound reproduction means as a response to an incoming call, and the method being wherein the ringing tone is modified into characters and sent to the telephone as characters with a ringing tone identifier identifying the transmission as a ringing tone transmission.

Yet the present invention concerns a terminal for data transmission, the terminal comprising a ringing tone memory for storing a ringing tone and means for transmitting the ringing tone, wherein it comprises means for transforming the ringing tone into characters and for sending said characters, and means for sending said characters with a ringing tone identifier identifying the transmission as a ringing tone transmission.

In a first embodiment of the invention, a ringing tone is sent as characters in a short message. When the ringing tone is sent to a mobile station in a short message, the message does not keep a voice channel engaged and, thus, a user can be talking on the mobile station at the same time. The short message is stored in a memory on a transmission channel, in which case the ringing tone will be transmitted to the mobile station even if the mobile station is engaged or switched off during transmission.

A ringing tone can also be sent in a short message from a computer through the Internet. Thus, users of a mobile station can send ringing tones to each other. The ringing tone is preferably sent as note data in the form of characters in a short message. A receiving mobile station receives the short message as an ordinary short message, no pre-warning of the incoming message is required. The short message has a predetermined identifier on the basis of which the receiving mobile station identifies it as a ringing tone and stores it in a ringing tone memory. In addition, in a mobile station according to the present invention, it is preferably possible to program by oneself ringing tones by means of a user interface, in which case users can send each other ringing tones programmed by themselves or other ringing tones stored in the mobile station's memory. Thus, the received ringing tone, stored in the memory, can also be modified by means of the user interface.

The invention simplifies the programming of a ringing tone, when a user of a mobile station does not have to perform operations in order to obtain a new ringing tone, i.e., it is neither necessary to program the ringing tone by means of a user interface nor to prepare the mobile station for receiving the ringing tone, but they can be received directly by means of wireless communication. In addition, the invention increases the possibilities of programming a ringing tone, when the user can receive ringing tones from a second user. As the ringing tone message includes a ringing tone identifier, reception of the ringing tone is easy, as the mobile station will itself identify the received message as a ringing tone without necessity of the user to be involved.

BRIEF DESCRIPTION OF THE DRAWINGS

In the following, the invention will be discussed in detail by referring to the enclosed drawings, in which.

DETAILED DESCRIPTION

In order to understand the first embodiment of the invention, the transmission and reception of a short message will be discussed in the following.

In digital mobile communications systems, as in the GSM system, in addition to calls and data transmission, it is also possible to send short text messages, so-called short messages. In the GSM system, this is known as the SMS (Short Message Service). By means of a mobile station, text messages can be both received from and transmitted to a second mobile station. One of the advantages of the short message service of the GSM system is also that a short message can be sent or received at the same time as an ordinary circuit-coupled communication is open, e.g., during a call. Thus, the transmission of a short message does not keep the mobile station engaged in case of a possible incoming call.

Figure 1:
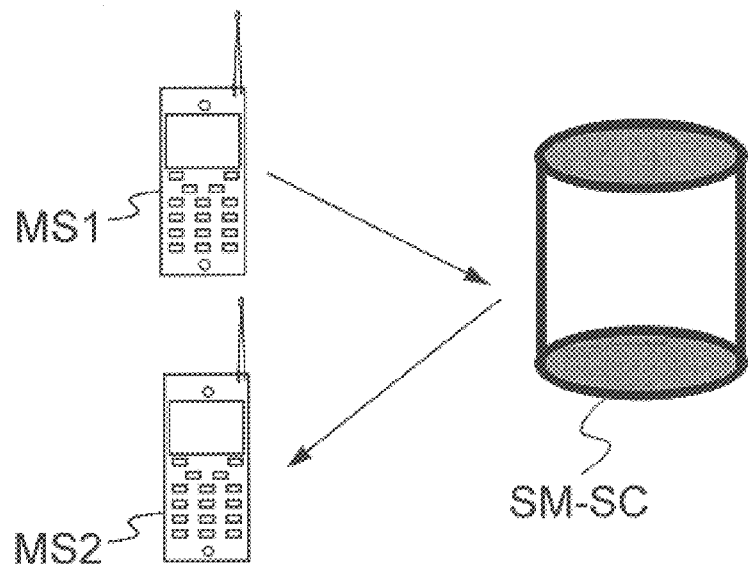
FIG. 1 illustrates the flow of a short message from a mobile station to a second mobile station.
Figure 2:
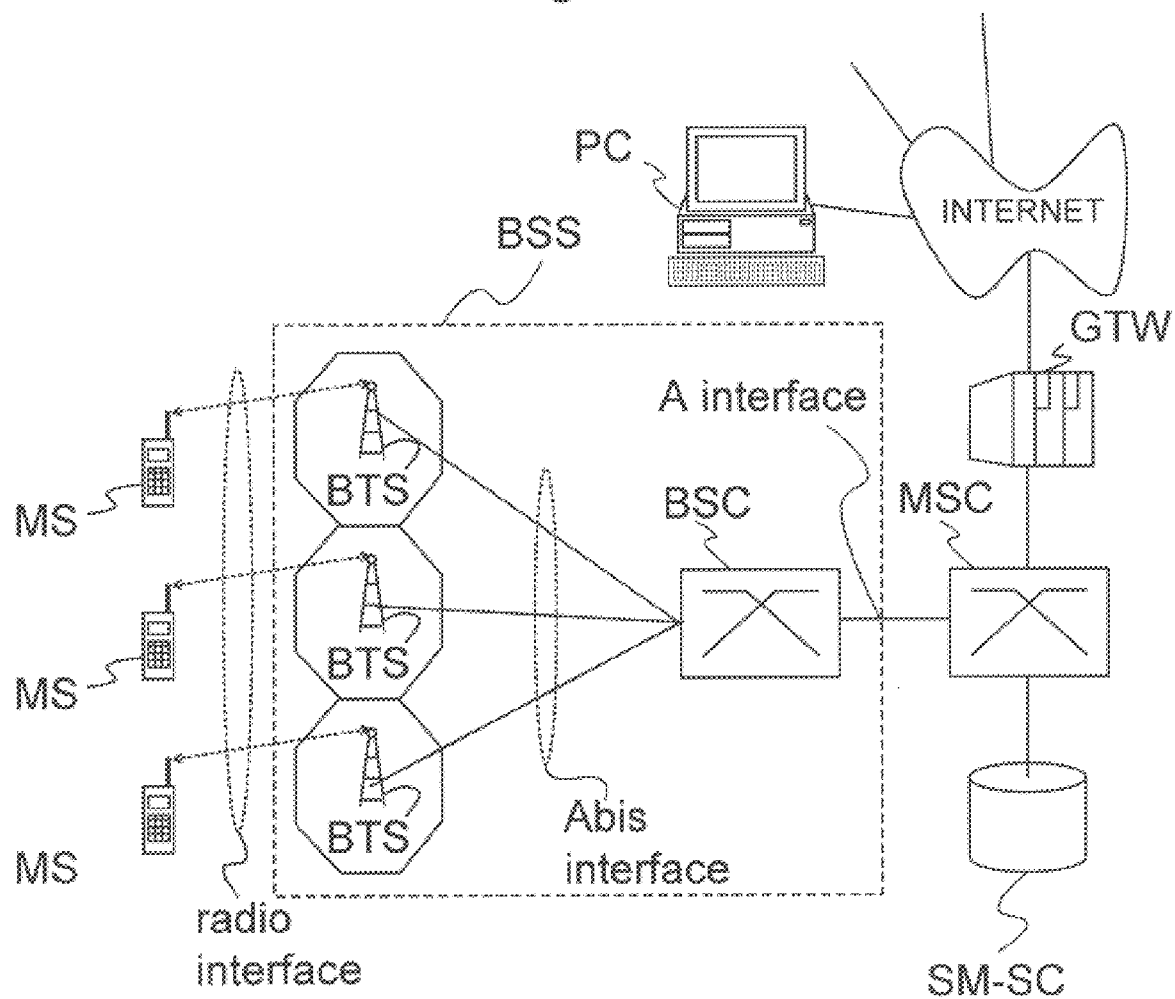
FIG. 2 illustrates connections of a mobile communications system to a short message service centre.

The advantage of short messages as compared to telephone calls is that they can be sent to a receiver although the receiver cannot be contacted at the time the message is being transmitted. This has been implemented by dividing the transmission of the short message, from a first mobile station to a second mobile station, into two parts as illustrated in FIG. 1: from a transmitting mobile station MS1 to a SM-SC (Short Message Service Centre), wherein the short message is stored and sent further to the actual destination, i.e., to a receiving mobile station MS2, as soon as contacted. In FIG. 2, the connection of the short message service centre SM-SC to a mobile communications system has been illustrated in more detail. In the following, the transmission and flow of short messages between different interfaces will be discussed by referring to FIGS. 1–5.

FIG. 2 illustrates the structure of a mobile communications system and connections for transmitting short messages. Mobile stations MS are connected to base stations BTS by means of radio communication. The base stations BTS are further connected, through a so-called Abis interface, to a base station controller BSC, which controls and manages several base stations. The entity formed by a number of base stations BTS (typically, by a few dozen base stations) and a single base station controller BSC, controlling the base stations, is called a base station system BSS. Particularly, the base station controller BSC manages radio communication channels and handovers. On the other hand, the base station controller BSC is connected, through a so-called A interface, to a mobile services switching centre MSC, which co-ordinates the formation of connections both from and to mobile stations. A further connection is made, through the mobile service switching centre MSC, to outside the mobile communications network. The aforementioned short message service centre SM-SC is coupled to the mobile services switching centre MSC.

When a user wants to send a short message by means of the mobile station MS1 (FIG. 1), he/she writes or retrieves from the memory a message to be transmitted (using a user interface of the mobile station) and gives the phone number of a mobile station MS2, i.e., an identifier of the mobile station MS2, whereto the message is going to be transmitted. In addition, the mobile station should have the contact information, i.e., the phone number of the short message service centre SM-SC. Normally, this has been stored in the memory of the mobile station, in which case it is not necessary to separately input the phone number in connection with the sending of each short message. Thus, when sending a short message, the message goes from the mobile station MS to the base station BTS, and from there, through the base station controller BSC and the mobile services switching centre MSC, further to the short message service centre SM-SC. The short message is stored at the short message service centre SM-SC, wherefrom it will be sent further to the receiving mobile station MS2, in which case the route of the message is the same as in transmission, but in the opposite direction. The short message service centre SM-SC will be informed whether or not the mobile station MS2 has received the short message. Thus, it can re-send the short message, if the mobile station MS2 has not received it for some reason.

In addition, short messages can be sent from a PC. In this case, the mobile services switching centre MSC is in connection with a server GTW (Gateway), which is in connection with the Internet. In this case, the PC that is in connection with the Internet can download from the Internet, for the transmission of the short message, a WWW page (World Wide Web), which can be found, e.g., at the server GTW. On this WWW page, the user inputs the telephone number of the receiving mobile station MS2 and the message to be transmitted, whereupon the message can be sent from the PC, in which case it goes through the Internet and the server GTW to the mobile services switching centre MSC and further to the short message service centre SM-SC, wherefrom the message is further directed to the receiving mobile station MS2 through the mobile communications network.

Figure 3:
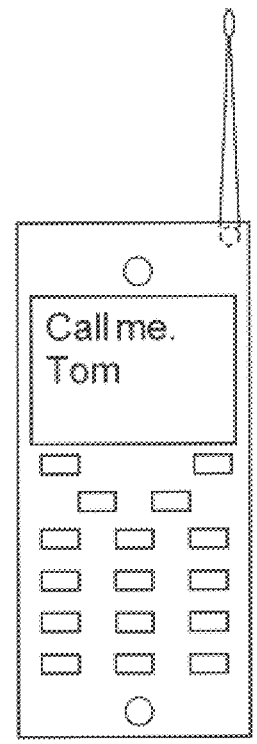
FIG. 3 illustrates a user interface of an ordinary mobile station.

By means of the short message service SMS of the GSM system, it is possible to send, at a time, a message the maximum length of which is 160 characters. The characters are seven-bit ASCII (American National Standard Code for Information Interchange) characters and, therefore, the maximum length of a message in bits is 1,120 bits, i.e., 140 bytes. Ordinary mobile stations, as the one illustrated in FIG. 3, have a small display and an advanced keyboard by means of which it is possible to write short messages, i.e., input different types of alpha-numeric characters. The received message is displayed on the display of the mobile station, which enables alpha-numeric characters to be displayed, as illustrated in FIG. 3.

Figure 4A:
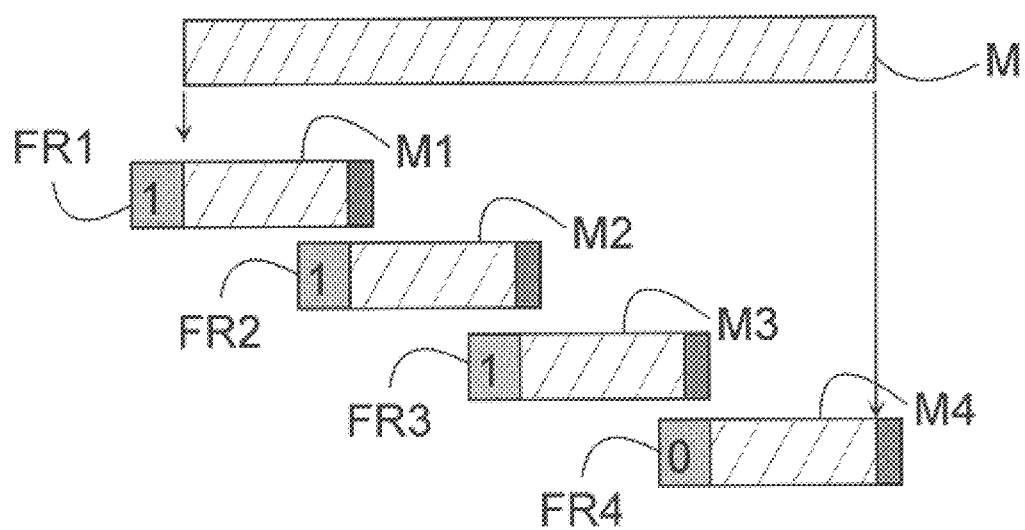
FIG. 4a illustrates segmenting of a message into frames in transmission.
Figure 4B:
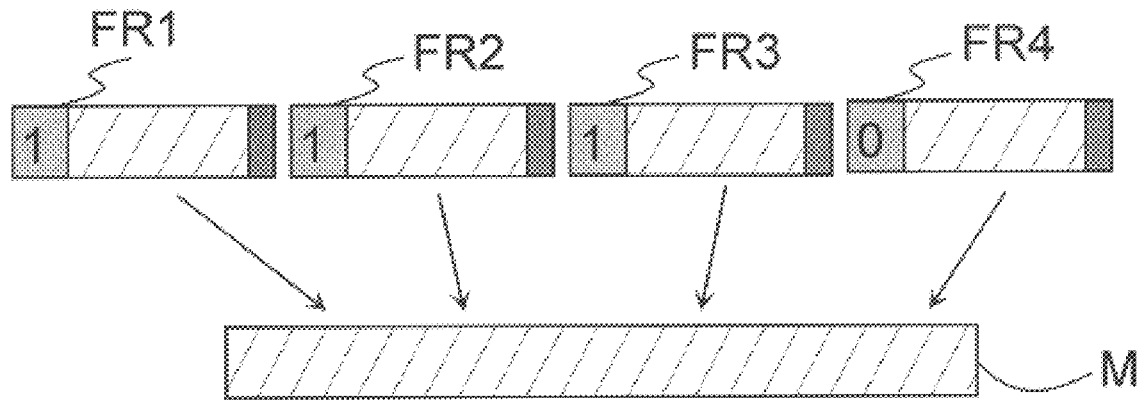
FIG. 4b illustrates reconstruction of a message in reception.
Figure 5:
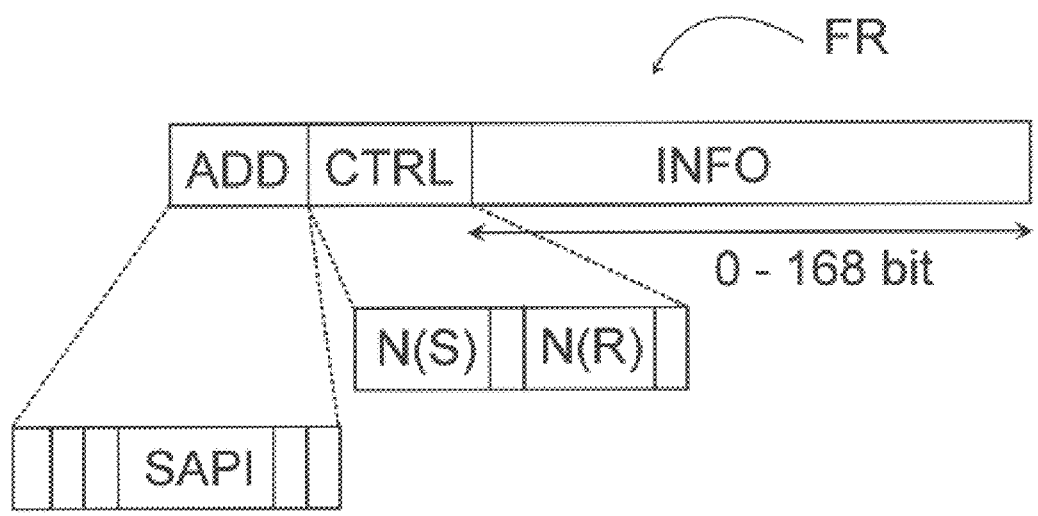
FIG. 5 illustrates a structure of a short message frame.

As is well known, transmissions in the GSM system have been divided into frames. When the length of a message to be transmitted exceeds the permissible maximum length of a frame FR, the message M must be segmented into parts M1–M4, and sent in several frames FR1–FR4, as illustrated in FIG. 4a. In reception, the mobile station reconstructs the message M, divided into several frames FR1–FR4, as illustrated in FIG. 4b. At a radio interface (FIG. 2), the maximum length of a frame is normally 168 or 184 bits and, therefore, a short message, the maximum length of which is 1,120 bits, must be segmented into several frames. FIG. 5 illustrates a frame, a so-called LAPDm frame (Link Access Protocol for the Dm channel), to be transmitted at a radio interface, which has normally been divided into three fields. The first field is an address field ADD, which contains the address of the destination of the message (i.e., a receiving mobile station identifier), given in several bytes. In the GSM system, signalling messages are also transmitted within corresponding LAPDm frames. In radio communication, there can simultaneously be two message flows independent of each other: signalling messages and short messages. These two different flows are separated from each other by means of a link identifier, a so-called SAPI (Service Access Point Identifier) to be added to the address field ADD. Its value can be 3, indicating signalling, or 0, indicating a short message. The second field is a control field CTRL, which contains the sending frame and receiving frame numbers N(S) and N(F). The third field is a data field INFO, containing the actual information, which contains a maximum of 168 bits of information, i.e., the contents of the actual short message.

The transmission of each ringing tone has been identified by means of a specific character code, i.e., an identifier, in which case the receiving mobile station can process the received message directly into a ringing tone, as specified. The identifier has preferably been implemented by using ASCII characters in an information field of the short message transmission frame, i.e., in a field INFO (FIG. 5), which contains the actual short message in characters. The identifier is an identifier agreed on in advance or an identifier formed in some other way, which both the transmitting and receiving device know to signify a ringing tone, e.g. a series of numbers 120 at the beginning of the short message. Because the ringing tone is transmitted in a short message, it can also be received by means of an ordinary mobile station, which does not support this type of ringing tone programming service, but is capable of transmitting and receiving short messages. By placing the ringing tone identifier in the field INFO, there is also the advantage that in an ordinary mobile station, which does not support this type of ringing tone programming service, but is capable of transmitting and receiving short messages, both the ringing tone identifier and the ringing tone in characters are displayed to a user. In addition, by means of this type of ordinary mobile station it is also possible to transmit a message, such as mentioned above, by first writing, on the message, the identifier of the ringing tone in question in characters, and the rest of the information, i.e., the ringing tone in characters, correctly divided. The reception of such a transmission by means of a mobile station, according to the present invention, will produce a fully received ringing tone.

Alternatively, the identifier of a short message containing a ringing tone is formed as a specific bit code in the address or control field of the short message (See FIG. 5). Also in this case, the transmitted ringing tone can be received by an ordinary mobile station in characters, but the ringing tone cannot be stored in a ringing tone memory. In this case, this kind of ringing tone cannot be sent by means of the ordinary mobile station, although a user could input the characters otherwise correctly, unless it is changed so that it, by a specific command, adds said bit code, because otherwise the ordinary mobile station cannot inform the ringing tone identifier.

Instead of a ringing tone identifier being indicated as a character code in a short message (in data field INFO), it can be indicated in an address field ADD of the short message, in which case it is given in bits. A specific byte in the address field of the transmission frame of the short message is a so-called TP-Data-Coding-Scheme, which has been specified in the GSM specification GSM 03.40 and 03.38. The four least significant bits of the byte can be freely used, whereupon they can be used to indicate, according to the present invention, that the short message contains a ringing tone, e.g., by giving said bites b3–b0, wherein b0 is the least significant bit of the byte, a value of 0000 or some other value agreed on.

When the ringing tone is indicated in this way, it does not take the space reserved for the character length of the short message (max. 160 characters).

The ringing tone can be changed into characters and included in the short message as characters in the form of notes in the following way.

Notes in characters:

| | |
|---|---|
| C, D, . . . , G, A, H | Notes from A to G of a lower octave |
| c, d, . . . , g, a, h | Notes from A to G of a higher octave |
| # | raises the preceding note a semitone (e.g., high) |
| b | flattens the preceding note a semitone (e.g., dull) |

Duration:

| | |
|---|---|
| no character | basic length |
| - | preceding note: half the basic length |
| + | preceding note: double the basic length |
| . | preceding note: 1.5 times the basic length |
| .. | preceding note: 1.75 times the basic length |

A length character may be cumulative, e.g., a single character always contributes to the effect of the character preceding it. For example, C+ means three times the basic length, C--- means 0.125 of the basic length.

Rests:

| | |
|---|---|
| ; | rest; as long as the basic length |
| , | rest; half the basic length |

Other rests can be input by using characters modifying the length of a note together with rest characters.

As presented above, a ringing tone produced by notes can be coded in characters, which can be sent in a short message, whereupon, in reception, the received characters can be processed into the transmitted ringing tone, which can be stored in a ringing tone memory and reproduced when the phone rings. Thus, the method is particularly suitable for a device, wherein the ringing tone can be programmed as notes through a user interface or it has been pre-stored in a ringing tone memory as notes.

In addition to the specifications presented above, other factors related to a ringing tone and its specification can also be specified as characters, e.g., in the following way:

| | |
|---|---|
| :ACD :X | ,wherein X is an optional number (integral number), repeats a note sequence ACD X times, twice if X is missing |
| /X ACD / | ,wherein X is an optional number (integral number), reduces the length of notes inside characters "/", e.g., by dividing by number X. Third notes, according to this specification, would be marked "/3 ACD /" |
| $ | Inputs sharp and flat notes, e.g., for all notes inside parentheses, in which case it is not necessary to separately input character # or b for these notes. |
| (:) | Specifies repetitions, e.g., so that (5CD:2E:F) is played CDE CDE CDF CD CD. |
| ! | Switches on/off a "staccato" music mode, e.g., until the following character, increases the length of a note by an appropriate percentage and reduces the proportion of a rest, thus accomplishing a fragmentary style without changing the overall time. In a computer simulation, increasing the length of a note by 50–60% or even by 70% sounds good still. |
| ? | Switches on/off a separate notes function, e.g., until the following character, increases the length of a note for a minimum period of time and a rest lasts for the rest of the time producing music, where two same notes one after another can be heard as separate notes, unlike a "flowing" music mode, wherein preceding notes would be heard as a single note. A rest between notes must have the same duration. Notes that are shorter than the specified rests cannot be heard as separate notes. In a computer simulation, rests between notes that last for about 30 ms sound good by means of the separate notes function. |
| . | Raises a default octave. If the default octave is 1, raises it to 2, otherwise 1. |
| " | Lowers a default octave. If the default octave is 3, lowers it to 2, otherwise 3. If it is assumed that there are 4 octaves in use, it is possible to |

-continued

| | |
|---|---|
| | use, as presented above, two octaves simultaneously by means of capital and small letters C ... H, c ... h. |
| X | raises all following notes X by one degree, wherein X is an integral number. Flattens, if X is a negative number. |
| Number (alone) | Specifies a tempo, beats per minute, e.g., how many notes of the basic length per minute. |
| Empty space to be ignored. | |
| In addition, a ringing tone can be combined with some other message through a user interface, for example: | |
| * | a flashing light when the phone is ringing - switches the light on/off. |

In the following, the implementation of a mobile station, according to the present invention, and its and operation in transmitting and receiving a ringing tone as a short message will be discussed in more detail by referring to FIG. 6.

Figure 6:
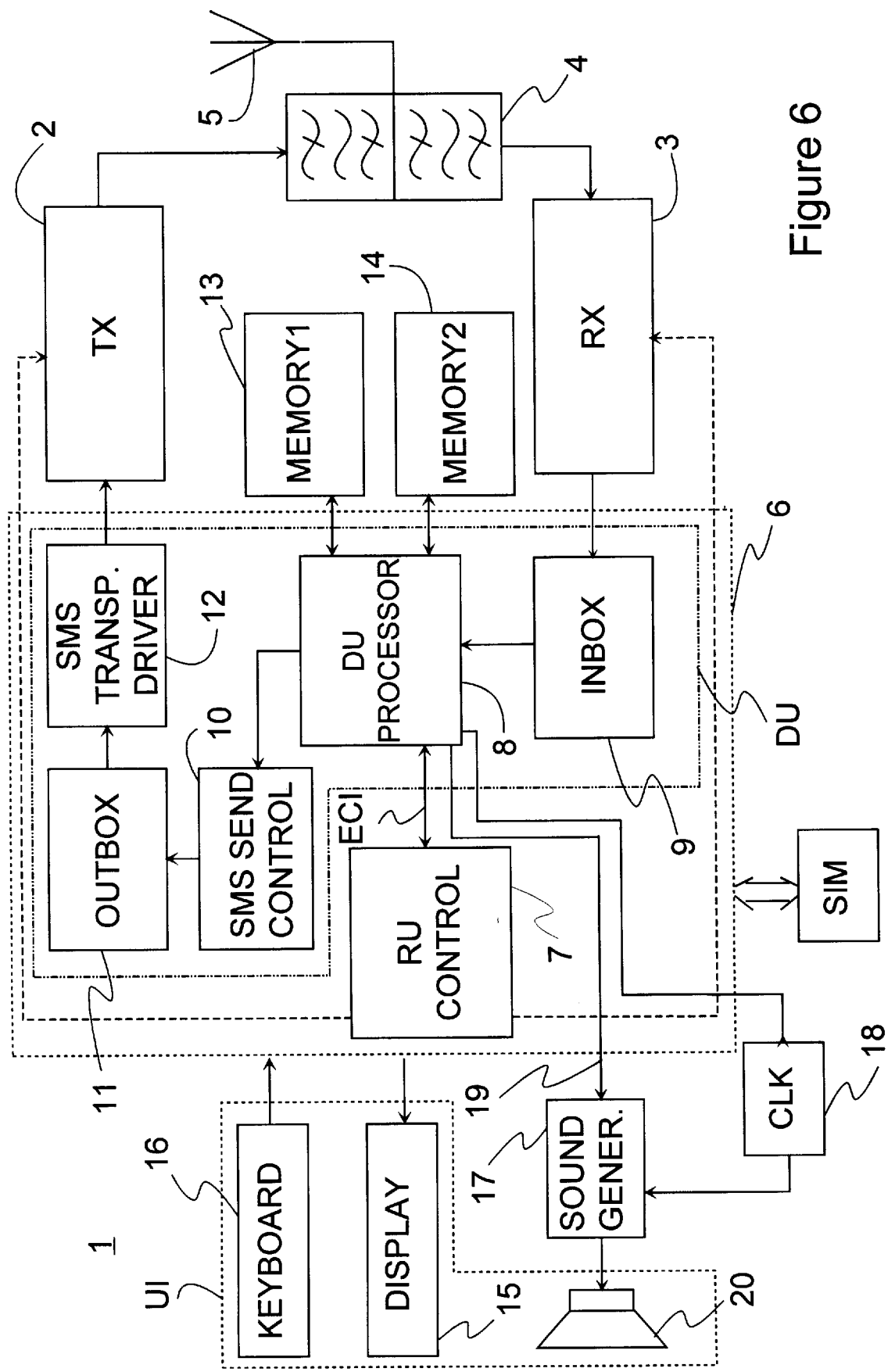
FIG. 6 illustrates implementation and operation of a mobile station, according to the present invention, when transmitting a ringing tone and receiving a short message.

In FIG. 6, there is a block diagram of the implementation of a mobile station according to the present invention. The mobile station is preferably a mobile station, which has circuits and a user interface that enable a ringing tone to be programmed. A mobile station 1 comprises, for communication using radio communication, a radio unit RU (the reference has not been marked in the figure), which comprises a transmitter branch 2, known from an ordinary mobile station, (comprising blocks implementing coding, interleaving, ciphering, modulating, and transmitting), a receiving branch 3 (comprising receiving, de-modulating, de-ciphering, de-interleaving, and implementing blocks) and, for transmission using radio communication, a duplex filter 4 that distinguishes between a received and transmitted message, as well as an antenna 5. The mobile station has a main control circuit 6 that controls its operation. Furthermore, the main control circuit 6 comprises still a RU controller 7 that carries out control functions of an ordinary mobile station. In addition, the mobile station main control circuit 6 comprises blocks 8–12 for sending ringing tones as a short message according to the present invention. Thus, the blocks 8–12 can be said to form a data processing unit DU of the mobile station, which can also be formed in full by programming the main control circuit (processor) 6. The controls of the radio unit RU and the mobile stations' data processing unit DU do not have to be integrated into the main control circuit but, instead, they could also be implemented apart from each other, so that the RU control circuit 7 is on the radio unit's side, and on the data processing unit's side, there is the DU processor 8, which is in connection with the RU control circuit 7 for establishing communication between the radio unit and the data processing unit.

In the implementation illustrated in FIG. 6, a first memory 13 is coupled to the main control circuit 6. The first memory can be a volatile memory, e.g., RAM, wherein the main control circuit stores in-use data. In addition, the mobile station has a second memory 14, which is preferably a permanent memory 14, wherein short messages, ringing tones and other data essential for the functioning of the mobile station, and any other data which a user wants to store permanently, are stored. Alternatively, the short messages can be stored off-line in a memory of an intelligent card, coupled to the mobile station, wherefrom there is a connection to the main control circuit 6. This type of intelligent card is known, e.g., from the GSM mobile communications system, as a SIM card (Subscriber Identity Module), which usually has storage, e.g., for storing telephone numbers.

The mobile station's user interface comprises a display 15, and for inputting data, a keyboard or other input device 16, such as a touch display.

In the case where the data processing unit DU and the radio unit RU are implemented as functionally independent units, both of them should, however, have either common or separate memories 13, 14, and a user interface UI. Communication between the units would be established by means of a connection between the DU processor 8 and the RU control circuit 7 which, in this connection, is referred to as an external control interface ECI.

In the following, we will discuss the operation of the mobile station, when transmitting ringing tones. By means of the user interface UI, the desired ringing tone is retrieved from the memory, in which case, on the basis of 16 commands from input devices, the control circuit 7 retrieves the ringing tone from the memory 14. When the user enters, by means of the input devices, a command to send the ringing tone, the DU processor 8 forms, from the ringing tone, a line of characters so that it places at the beginning of the line the ringing tone identifier, e.g., a series of numbers 120 (unless the identifier is given in the address field), then transforms the ringing tone into characters, e.g., to ASCII characters as presented above, and places the characters after the identifier. As presented above, a short message is sent by air in bits or as binary characters in frames. The DU processor 8 transforms the ASCII characters into binary characters. One way of implementing this transformation will be discussed later. Hence, the DU processor 8 comprises, for the processing of the characters, character transformation functions, which have been implemented programmably and stored in the memory 14, wherefrom the DU processor 8 retrieves the program and performs the functions according to the program. The DU processor 8 transfers the line of characters formed to a SMS transmission controller 10, which adds to the message address information, i.e., the information on the destination on the basis of the user input information. Thus, this type of SMS transmission controller is a kind of bit and/or character generator. The transformation of the ringing tone into characters is preferably implemented as an application program, stored in the memory 14, which is used by means of the DU processor 8.

When the address information has been added at the SMS transmission controller 10, the message is transferred into an outbox 11, which tries to send the message, and which has a buffer, wherein the message is stored in case the transmission fails. If the transmission fails, the outbox 11 retries to send the message. When the DU controller 8 notices that the radio unit RU is ready to send the message, the message is transferred to a message transfer running circuit 12, which adds to the message information relating to the mobile communications system in question, such as validity information (which indicates in which direction the message is going, i.e., from a mobile station to a message service centre or vice versa), processes the address information into a form required by the mobile communications system, and adds to the message the address of the message service centre, as well as the short message identifier (SAPI), and forms from the information to be transmitted, e.g., a digital signal for a transmitter 2, and sends the message to the radio transmitter branch 2 of the radio unit RU. In the case where the ringing tone identifier is placed in bits in the address field ADD, the running circuit 12 adds to the message the identifier in question. The transmitter branch 2 codes the signal according to the specifications of the mobile communications system, and forms, on the basis of the signal it receives from the running circuit 12, the frames to be transmitted, which the transmitter sends using radio communication to the short message service centre SM-SC, wherefrom they are sent further to the receiver (see FIG. 1). In the transmitter branch 2, the message is processed according to the mobile communications system, e.g., coding, interleaving, ciphering, burst forming, modulating, and transmission.

Operations according to blocks 8, 10–12 could also be carried out by means of a PC, which has a connection to a short message service centre, e.g., through the Internet. The operations 8, 10–12 could be carried out programmably by means of a computer processor, and different kinds of ringing tones can be stored in the computer's memory. In this case, it can be assumed that the block 12 is coupled to the computer outport or modem, wherefrom the Internet can be contacted and, thus, the message can be sent to the short message service centre, which transmits the short message to a receiving mobile station, as presented in FIG. 2.

In the following, we will discus the operation of the mobile station in receiving a ringing tone as a short message. When a communicator receives a ringing tone as a short message, the message first arrives at the radio unit RU. There, at a receiving branch 3, the processing of the message takes place according to the mobile communications system, such as reception, demodulating, de-ciphering, de-interleaving, and decoding. If the received frame identifier (SAPI) indicates that the message is a short message, it will be transferred into a destination box 9 of the data processing unit, which can be a memory for storing the message. The received short message can be stored in a memory located in the SIM card or in the mobile station's permanent memory 14. If the received message is an ordinary short message, the DU processor 8 will report the short message received. If the message has an identifier, which indicates that it is a ringing tone, the DU processor 8 will perform a transformation of the binary characters into ASCII characters and further the transformation of the ASCII characters into a ringing tone and store the ringing tone in the permanent memory 14. A person skilled in the art will understand that alternatively, the user my first be asked whether to accept or reject, i.e. whether to store in the permanent memory or not, the received ringing tone. In addition, error checking can be added to the transformation so that the DU processor checks whether the received sequence has any errors. If there are no errors, the ringing tone sequence is stored in the ringing tone memory 14 as a ringing tone, in which case the reception of the short message will be displayed to a user as a received ringing tone. If there were errors, the ringing tone sequence is not stored in the ringing tone memory, but only in the short message memory 14 as an ordinary short message. When the ringing tone has been successfully received, the DU processor 8 can launch the application for programming the ringing tone and displaying the ringing tone on the display as notes and to present the ringing tone as notes on the display 15 (if the mobile station has such an application).

In the following, we will discuss one way of transforming ASCII characters into binary characters. The ASCII characters can be presented as hexadecimals, which can be easily further transformed into binary numbers. In the following, we will present how the word "Calling" is transformed into a binary number. In the following, two numbers, in a hexadecimal form, correspond to the ASCII character, separated by a space, and each of the hexadecimal characters can be presented in four bits, i.e., in the following, each ASCII character is presented by means of 8 bits.

As ASCII characters: Calling

In the hexadecimal form: 43 61 6C 6C 69 6E 67

In the binary form: 0100 0011 0110 0001 0110 1100 0110 1100 0110 1001 0110 1110 0110 0111

In the actual transmission, the characters are sent one after another without spaces, i.e., as an unbroken bit sequence. Thus, for each ASCII character, there is a specific hexadecimal and binary form, in which case the examples presented above for specifying notes by means of ASCII characters can be transformed into binary characters.

When the note specifications have been transformed into a ringing tone message in a binary form, it can easily be sent in an infrared signal by means of an infrared link or in USSD, wherein it can also be sent as characters as in SMS. As is well known, it is possible to implement, in a mobile station, an infrared link for transmitting and receiving an infrared signal. Thus, in addition to radio parts 2–5, a mobile station, as illustrated in FIG. 6, could have an infrared transmitter and receiver similarly connected to a main control circuit 6. For sending a ringing tone in the USSD, the necessary modifications can be implemented in transmission and reception blocks 2 and 3.

Another alternative for sending a ringing tone as characters is to first convert it into a MIDI form (Musical Instrument Data Interface), which is a well known communications language for instruments. This could be implemented by arranging, in a mobile station, a MIDI converter. The MIDI converter would preferably be located in the DU processor 8 which, in this case, in reception, would convert the characters, received in MIDI, into an appropriate form for the telephone's ringing tone generator and memory. Similarly, in transmission, the MIDI converter would convert the ringing tone into characters in accordance with the MIDI form. The MIDI converter would enable ringing tones to be composed, e.g., by means of computer-based composition programs supporting the MIDI form and, thus, the transmission of the produced melody from a computer to a mobile station, e.g., in a short message.

Figures 7A, 7B:
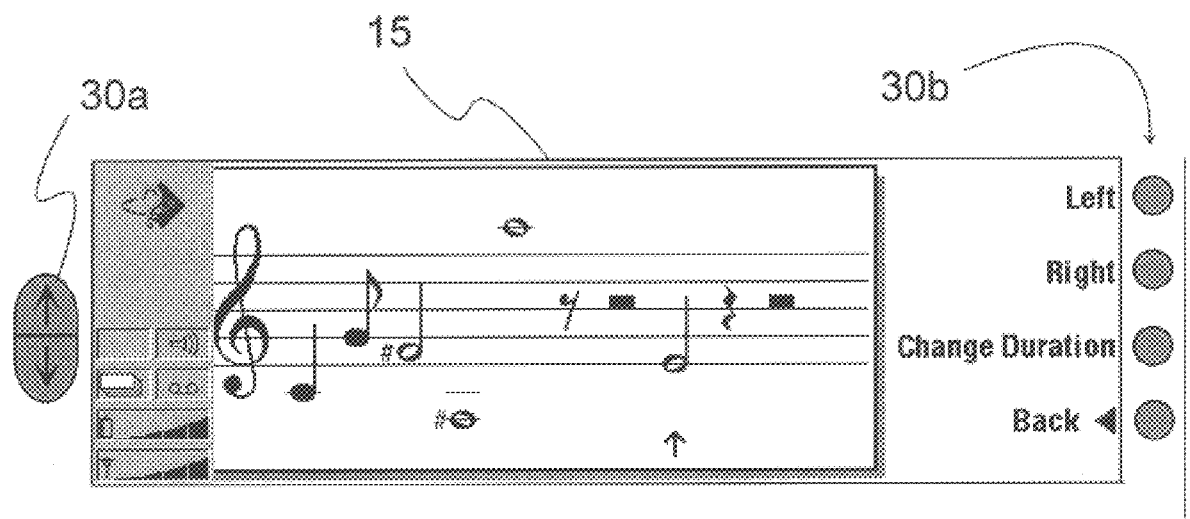
FIG. 7a illustrates notes produced on a display of a mobile station according to the present invention.
FIG. 7b illustrates an example of a display of a mobile station for producing a ringing tone.

In the following, we will discuss, as an example, one way of implementing the application presented above for programming a ringing tone by means of a user interface, i.e., a way of programming ringing tones in a telephone as notes by referring to FIG. 7b.

In this exemplary implementation, a stave is produced on the display 15 of the mobile station, whereon, by means of a menu and keys 30a and 30b, displayed on the display, desired notes can be selected and placed in the desired place on the stave, displayed on the display, by means of a cursor moved by keys. The display illustrated in FIG. 7b can be implemented in a mobile station with a larger display or, equally, a graphic stave can be implemented on a display of the size of an ordinary mobile station, e.g., on a matrix-type liquid crystal display.

In this exemplary implementation, from the menu to be displayed on the display through keys, the desired clef can be selected and, always at the place indicated by the cursor, a note can be placed, the duration and pitch of which (i.e., the position on the stave) can be changed by means of the keys 30a and 30b, and the menu. For example, to modify the duration of a note, a duration menu is accessed through the keys 30b, wherein, through the browse key 30a, an eighth note, a quarter note, a half note or a whole note or, correspondingly, an eighth rest, a quarter rest, a half rest or a whole rest can be selected on the stave. These notes have been illustrated in FIG. 7a. Similarly, to modify the pitch of a note (the position of the note on the stave in the vertical direction), the position of the note on the stave can be raised by pressing the browse key 30a in one direction (the key pointing upwards), and the position of the note on the stave can be lowered by pressing the browse key 30a in the other direction (the key pointing downwards). In this way, it is possible to produce any desired note, e.g., rest, c, d, e, f, g, a, h, $c^1$, $d^1$, $e^1$, $f^1$, $g^1$, $a^1$, $h^1$, $c^2$, $d^2$, $e^2$, $f^2$, $g^2$, $a^2$, or $h^2$. Sharp (cis, dis, eis, fis, gis, ais, his, $cis^1$, $dis^1$, ..., $cis^2$, $dis^2$, ..., $his^2$) and flat (ces, des, es, fes, ges, as, b, $ces^1$, $des^1$, ..., $ces^2$, $des^2$, ..., $b^2$) notes can also be produced through the browse key 30a, in which case on the display, in front of the note, a symbol indicating either a sharp or flat note is produced, which have also been illustrated in FIG. 7a. In this way, it is possible to produce, on the stave, the desired notes and rests one after another, e.g., so that the melody has a maximum of 60 successive notes. An example of a display of a mobile station, when it is in a melody-producing mode, has been illustrated in FIG. 7b, which shows a stave, a clef, different notes, as well as a cursor (arrow), which indicates the place of the note, the length (duration) and pitch of which can be changed, in the same way as when selecting a note as presented above. On the stave, illustrated in FIG. 7b, the third note and the fourth note from the left are examples of sharp (raised) notes.

As an alternative to producing tones on a stave by means of keys and a menu, the notes could be displayed as icons on the display, wherefrom they could be dragged and released (i.e., placed) in the desired place on the stave by means of a pointer moved by a so-called spin wheel or track ball. The use of the spin wheel or track ball could be avoided by using a touch display, in which case the icons in question could be placed on the stave by means of a finger or a pen.

In addition, by means of the user interface, a tempo could be set, e.g., beats per minute bpm, at which tempo the produced ringing tone (the melody written on the stave) is reproduced. In this case, the length of a fourth note in milliseconds is t=1000×(60/temp), in which case, if the tempo is 150 bpm, the length of the fourth note is 400 ms or 0.4 seconds. The tempo can be set in numbers, e.g., between 50 ... 999 bpm. The tempo is preferably set by selecting, from the menu, a tempo command in which case the desired tempo can be input onto the display through keys.

As an alternative, the notes could be displayed on the display as letter symbols and/or programmed through an ordinary keyboard of a telephone comprising twelve keys (keys 0–9, * and #). In this case, each tone (a note or a rest) can be produced through a specific key or as a combination of two keys. In this case, the pressing of one or two keys corresponds to a specific tone, the corresponding note of which can be displayed on the mobile station's display as a response to the pressing of the key (either as a letter symbol or as a note on a stave), as presented above, or the tone can be reproduced, as a response to the pressing of the key, through a speaker of the mobile station, in which case a user can hear it. The duration of the pressing of the key or, in the case where two successive presses are executed, e.g., the duration of the latter press is proportional to the length of the tone. In addition, the programming of a ringing tone could be implemented by inputting, through a user interface, characters, e.g., in a similar way as presented above for transforming the ringing tone for a short message.

In the following, we will discuss how to produce a ringing tone in a telephone by referring to FIG. 6. A central unit 6 receives in a short message (or from a user interface UI, which comprises a keyboard 16 and/or a display 15, according to the methods presented above) tones (notes) selected by a user are received and stored in a memory 14 as a whole melody. When a call is coming in, according to the specifications of mobile communications systems, a message from a base station arrives first at the mobile station. This message is received from an antenna 5 to a receiver 3 of the mobile station, wherefrom the message arrives at the central unit 6. As a response to this, the central unit 6 gives a sound generator 17 a control signal 19. On the basis of the control signal, the sound generator 17 generates the ringing tone, which is a sequence of sounds with a specific frequency based on the melody specified by the notes. The central unit 6 produces the control signal by reading, from the memory 14, the ringing tone stored therein. Thus, the control signal 19 contains the information for the sound generator 17 specifying what kind of ringing tone it should produce for a ringing tone reproduction device 20, which can be a buzzer, a speaker or some other transformer that transforms the electric signal into sound. When a user answers the phone by pressing an answering key, the user interface UI gives a signal to the central unit 6 which, as a response to the pressing of the key, stops giving the sound generator the ringing tone control signal 19, whereupon the ringing tone stops.

As a sound generator 17, it is possible to use, e.g., a commercially available Codec ST5090 circuit, manufactured by SGS-Thomson, which includes a sound generator, which is capable of producing sounds between 15.6 Hz ... 3,984 Hz at 15.6 Hz intervals, i.e., 256 sounds each having a different frequency. The sound frequency is produced on the basis of an 8-bit signal, which indicates a number between 0–256, in which case number 1 of the control signal corresponds to step 1 of the sound generator, i.e., to a frequency of 15.6 Hz and, correspondingly, number 2 corresponds to a frequency of 31.2 Hz, etc. The tones presented above can thus be reproduced as sounds, e.g., according to the following frequencies (not necessarily exact values, order of magnitude given) and by means of the following control signals (bytes), brought to the sound generator, of which some have been presented below and the rest can be concluded by persons skilled in the art according to the principle presented above:

a=880 Hz corresponding to step 56 of the sound generator, i.e., control byte '00111000' (more accurately, 56×15.6 Hz=873.6 Hz), ais=932 Hz, b=988 Hz corresponding to the sound generator's step 63 or control byte '00111111' (more accurately, 63×15.6 Hz=982.8 Hz), $c^1$=1,047 Hz, $cis^1$=1,109 Hz, $d^1$=1,175 Hz, $dis^1$=1,245 Hz, $e^1$=1,319 Hz, $f^1$=1,397 Hz, $fis^1$=1,480 Hz, $g^1$=1,568 Hz, $a^1$=1,760 Hz, $ais^1$=1,865 Hz, $h^1$=1,976 Hz, $c^2$=2,093 Hz, $cis^2$=2,217 Hz, $d^2$=2,349 Hz, $dis^2$=2,489 Hz, $e^2$=2,637 Hz, $f^2$=2,793 Hz, $fis^2$=2,960 Hz, $g^2$=3,136 Hz, $gis^2$=3,322 Hz and $a^2$=3,520 Hz corresponding to the sound generator's step 226 or control byte '11100010' (more accurately, 226×15.6 Hz=3,525.6 Hz).

The frequencies corresponding to tones c-$a^2$ and to their raised and flattened tones, have preferably been pre-defined in the mobile station (or, at least, the tones necessary for producing the ringing tone), e.g., stored in the memory 14. One byte is stored in the memory 14 for each tone or sound to be produced, in which case, if the melody is formed of 60 tones, 60 bytes will be stored in the memory. The central unit 6 retrieves these bytes from the memory 14 (12) and controls the sound generator 17 to produce the melody as the ringing tone. Said known codec circuit also has a clock entry and an internal clock signal generator which, in FIG. 6, has been illustrated as an off-line clock generator 18, which controls the operation of the sound generator 17 according to a specific clock tempo. This clock tempo can be fixed, so that the tempo of the sound generator is set to, e.g., 150 bpm. The tempo can be specified in a short message or changed through the user interface. The set tempo is stored in the memory 14, and the sound generator 17 is controlled to generate sound at the set tempo on the basis of a signal it receives from the clock generator 18.

The central unit 6 identifies characters (or characters produced through the user interface UI) or pressing of keys and processes them to a frequency corresponding to the character or press of the key in question, and stores, in the memory 14, the signal corresponding to the frequency in question, which is taken to the sound generator 17, when the ringing tone is reproduced.

Another method for producing a control signal for the sound reproduction device 20 is to use, as the sound generator, a counter, e.g., a 16-bit counter, so that it counts downwards from 65,535 to 0. When a sound is produced, the counter is released to count downwards from a pre-set figure. When the counter reaches 0, a pulse is produced, and the counter re-begins to count downwards from a pre-set figure. A sound is formed of a number of pulses. The counter counts from 65,535 to 0 in 1/18 seconds, in which case, a pulse wave corresponding to 18 Hz is produced. If, in this case, 4,096 is given to the counter as the pre-set figure (in which case, it counts from 4,096 to 0), a pulse wave having a frequency of (65,535/4,096)×18=288 Hz is produced. In this way, pulse waves with different frequencies between 18 Hz–1.18 MHz can be produced. Pulse waves, produced in this way, can be used as a pulse-width modulation to be input into a sound reproduction device, such as a buzzer, which vibrates according to the pulse wave.

As is well known, a user may select, from current telephones, through a user interface, the ringing tone, stored in a ringing tone memory, he/she wants to be reproduced when the telephone rings.

The present invention enables new ringing tones to be obtained for a telephone quickly and in a simple way. It is not necessary for a user to program a ringing tone through a user interface or to take the telephone to a service outlet where a ringing tone would be loaded electronically. Neither is it necessary to prepare a ringing tone memory of the telephone, but ringing tones can be received directly by means of wireless communication. Similarly, the user can him/herself send ringing tones to a second mobile station. In addition, ringing tones can be transmitted to a mobile station, in a short message, from a computer which is in connection with a short message service centre, e.g., through the Internet.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A mobile communications system, having a mobile communications network and at least one mobile station for wireless communication, the system comprising:

means for transmitting and receiving speech, a memory for storing a ringing tone, means for reproducing the ringing tone as a signal of an incoming call, means for modifying the ringing tone, stored in the memory, into characters, and means for transmitting said characters with a ringing tone identifier identifying the transmission as a ringing tone transmission.

2. A mobile communications system, having a mobile communications network and at least one mobile station for wireless communication, the system comprising:

means for transmitting and receiving speech, a ringing tone memory for storing a ringing tone, means for reproducing the ringing tone as a signal of an incoming call, means for receiving messages with characters, means for detecting a ringing tone identifier in a received message informing the message is a ringing tone, means for receiving a ringing tone as characters through wireless communication, and means for modifying said characters into a form for being stored in the ringing tone memory.

3. A mobile station for wireless communication, comprising:

means for transmitting and receiving speech, a ringing tone memory for storing a ringing tone, means for reproducing the ringing tone as a signal of an incoming call, means for modifying the ringing tone, stored in the memory, into characters, and means for transmitting said characters with a ringing tone identifier identifying the transmission as a ringing tone transmission.

4. A mobile station for wireless communication, comprising:

means for transmitting and receiving speech, a ringing tone memory for storing a ringing tone, means for reproducing the ringing tone as a signal of an incoming call, means for receiving messages with characters, means for detecting a ringing tone identifier in a received message informing the message is a ringing tone, means for receiving a ringing tone as characters through wireless communication, and means for modifying said characters into a form for being stored in the ringing tone memory.

5. A method for programming a ringing tone of a telephone, comprising the steps of:

storing a ringing tone in a memory, reproducing said ringing tone by means of sound reproduction means as a response to an incoming call to the telephone, and modifying said ringing tone into characters and transmitting it to the telephone by wireless communication as characters with a ringing tone identifier identifying the transmission as a ringing tone transmission.

6. A method according to claim 5, wherein a ringing tone is sent to the telephone as characters containing specifications of notes.

7. A method according to claim 5, wherein, in the telephone, upon receiving a message and detecting a ringing tone identifier in the message received as characters, the characters are modified into such a form that they can be stored in a memory.

8. A method according to claim 5, wherein the characters are sent in a short message.

9. A terminal for data transmission, comprising:

a ringing tone memory (14) for storing a ringing tone, means for transforming the ringing tone into characters, and means for transmitting said characters with a ringing tone identifier identifying the transmission as a ringing tone transmission.

10. A terminal according to claim 9, further comprising:

means for establishing a connection to a short message service center of a mobile communications system, and means for transmitting said characters in a short message through the short message service center.

* * * * *